(12) United States Patent
Spick et al.

(10) Patent No.: US 11,421,453 B2
(45) Date of Patent: Aug. 23, 2022

(54) DEVICE FOR DETECTING A USER'S INTENTION TO LOCK OR UNLOCK A MOTOR VEHICLE DOOR AND ASSOCIATED DOOR HANDLE

(71) Applicants: Continental Automotive France, Toulouse (FR); Continental Automotive GmbH, Hannover (DE)

(72) Inventors: Gabriel Spick, Toulouse (FR); Bertrand Vaysse, Tournefeuille (FR); Bernadette Peris, Capens (FR); Stéphan Baudru, Pinsjustaret (FR)

(73) Assignees: Continental Automotive France; Continental Automotive GmbH

( * ) Notice: Subject to any disclaimer, the term of this patent is extended or adjusted under 35 U.S.C. 154(b) by 358 days.

(21) Appl. No.: 16/639,804

(22) PCT Filed: Sep. 3, 2018

(86) PCT No.: PCT/FR2018/052148
§ 371 (c)(1),
(2) Date: Feb. 18, 2020

(87) PCT Pub. No.: WO2019/048765
PCT Pub. Date: Mar. 14, 2019

(65) Prior Publication Data
US 2021/0123270 A1   Apr. 29, 2021

(30) Foreign Application Priority Data

Sep. 5, 2017   (FR) ...................................... 1758159

(51) Int. Cl.
*B60R 25/01* (2013.01)
*E05B 81/76* (2014.01)
(Continued)

(52) U.S. Cl.
CPC .............. *E05B 81/77* (2013.01); *B60R 25/01* (2013.01); *G01D 5/24* (2013.01); *G01D 11/245* (2013.01);
(Continued)

(58) Field of Classification Search
CPC ............ E05B 81/77; B60R 25/01; G01D 5/24
See application file for complete search history.

(56) References Cited

U.S. PATENT DOCUMENTS

2010/0136917 A1   6/2010   Castandet
2010/0187838 A1   7/2010   Ieda et al.
(Continued)

FOREIGN PATENT DOCUMENTS

EP   2172605 A1   4/2010
FR   2964517 A1   3/2012
(Continued)

OTHER PUBLICATIONS

English Translation of Written Opinion for International Application No. PCT/FR2018/052148, dated Nov. 23, 2018, 8 pages.
(Continued)

*Primary Examiner* — Alvaro E Fortich
(74) *Attorney, Agent, or Firm* — RatnerPrestia

(57) ABSTRACT

A device for detecting a user's intention to lock or to unlock a motor vehicle door. The device contained in a watertight housing, integrated into a non-watertight handle, the lower part of which includes drainage holes, a part of the housing being immersed in water. The device including: a capacitive
(Continued)

approach and/or contact detection sensor, having at least one detection electrode, a variable detection capacitance representative of the approach of the user's hand, a charging/discharging capacitor Cs, and a protective electrode Ep situated in the part of the housing that is immersed in water, electrically coupled to the detection electrode and connected to a terminal of the charging/discharging capacitor Cs such that the protective electrode Ep is simultaneously at the same potential as the terminal of the charging/discharging capacitor during the various steps of charging/discharging the detection capacitor and the charging/discharging capacitor that are necessary to estimate the detection capacitance.

7 Claims, 3 Drawing Sheets

(51) Int. Cl.
  *G01D 5/24* (2006.01)
  *G01D 11/24* (2006.01)
(52) U.S. Cl.
  CPC ..... *E05Y 2400/86* (2013.01); *E05Y 2900/531* (2013.01)

(56) References Cited

U.S. PATENT DOCUMENTS

| | | | |
|---|---|---|---|
| 2010/0264940 A1* | 10/2010 | Tsuchida | H03K 17/962 340/5.6 |
| 2013/0194069 A1* | 8/2013 | Baudru | B60R 25/20 340/5.72 |
| 2017/0030119 A1 | 2/2017 | Usui | |
| 2018/0283843 A1* | 10/2018 | Adams | E05B 81/77 |
| 2018/0367139 A1* | 12/2018 | Pribisic | H03K 17/9622 |

FOREIGN PATENT DOCUMENTS

| | | |
|---|---|---|
| WO | 2008135129 A2 | 11/2008 |
| WO | 2009068991 A1 | 6/2009 |

OTHER PUBLICATIONS

International Search Report and Written Opinion for International Application No. PCT/FR2018/052148, dated Nov. 23, 2018, 10 pages.

* cited by examiner

Prior Art

DEVICE FOR DETECTING A USER'S INTENTION TO LOCK OR UNLOCK A MOTOR VEHICLE DOOR AND ASSOCIATED DOOR HANDLE

CROSS REFERENCE TO RELATED APPLICATIONS

This application is the U.S. National Phase Application of PCT International Application No. PCT/EP2018/052148, filed Sep. 3, 2018, which claims priority to French Patent Application No. 1758159, filed Sep. 5, 2017, the contents of such applications being incorporated by reference herein.

FIELD OF THE INVENTION

The invention relates to a device for detecting a user's intention to lock or to unlock a motor vehicle door and to a vehicle door handle comprising said device.

BACKGROUND OF THE INVENTION

Nowadays, vehicle door handles are fitted with devices for detecting the presence of a user. The detection of the presence of a user, coupled with the recognition of a "hands-free" electronic fob for remote access control carried by this user, allows the remote locking and unlocking of the opening elements of the vehicle. Thus, when the user, carrying the corresponding electronic fob identified by the vehicle, wishes to unlock the vehicle, he approaches the handle or touches the door handle of the vehicle, and the opening elements of the vehicle are then automatically unlocked. By approaching or by pressing on a precise location of the door handle of the vehicle, called "unlocking zone", the door (or alternatively all of the opening elements) is (are) unlocked without any other action from the user. Conversely, when the user, still carrying the necessary fob identified by the vehicle, wishes to lock his vehicle, he closes the door of his vehicle and he approaches or momentarily presses on another precise location of the handle, called "locking zone". This movement makes it possible to lock the opening elements of the vehicle automatically.

These presence detection devices generally comprise two capacitive sensors, in the form of two electrodes connected electrically to a printed circuit board and integrated into the door handle, each in a precise locking or unlocking zone. Generally, one electrode is dedicated to each zone, that is to say one electrode is dedicated to detecting the approach and/or the contact of the hand of the user in the locking zone and one electrode is dedicated to detecting the approach and/or the contact of the hand of the user in the unlocking zone.

The presence detection device furthermore comprises a generally LF (low-frequency) radiofrequency antenna. The detection device is connected to the electronic computer of the vehicle (ECU: abbreviation for "electronic control unit") and sends it a presence detection signal. The electronic computer of the vehicle has, beforehand, identified the user as being authorized to access this vehicle, or alternatively, following the reception of this presence detection signal, it performs this identification. To this end, it sends an identification request to the fob (or to the remote controller) carried by the user by way of the radiofrequency antenna. This fob in response sends its identification code to the electronic computer of the vehicle through RF (radiofrequency) waves. If the electronic computer recognizes the identification code as the one authorizing access to the vehicle, it triggers the locking/unlocking of the door (or of all of the opening elements). If, on the other hand, the electronic computer has not received any identification code or if the received identification code is erroneous, locking or unlocking is not performed.

Such vehicles are therefore equipped with door handles comprising a detection device, itself comprising a generally low-frequency radiofrequency antenna, and two electrodes connected to a microcontroller, integrated into a printed circuit board and supplied with a voltage.

Purely for the sake of explanation, consideration will be given here to a detection device D comprising two capacitive sensors in the form of two electrodes, one electrode dedicated to the unlocking zone and one electrode dedicated to the locking zone, said two electrodes being connected to a printed circuit board comprising a microcontroller, and an LF antenna. A detection device D from the prior art is described with reference to FIG. 1.

FIG. 1 shows a motor vehicle door P handle 10 (vehicle not shown) in which there is situated a device D for detecting the presence of a user. Said door P handle 10 comprises a first outer surface S1 oriented in the direction of the door P and a second outer surface S2, opposite the first outer surface S1 and therefore oriented on the side opposite the vehicle, more precisely toward the user (not shown). This detection device D, which generally takes the form of a watertight housing B, comprises a first unlocking electrode E2, one face of which is situated close to the first outer surface S1, an LF antenna (not shown), one face of which is situated close to the second outer surface S2, a second locking electrode E1, one face of which is situated close to the second outer surface S2, and control means 60. The first and the second electrode E1, E2 are connected to the control means 60. These control means 60 measure the capacitance between the terminal of each first and second electrode E1, E2 and ground, formed by the hand of the approaching user, so as to detect the presence (the approach and/or the contact) of a user in the detection zones, that is to say in a locking zone Z1 or in an unlocking zone Z2, and consist for example of a microcontroller 60 integrated into a printed circuit board 80. The LF antenna (not shown) is for its part connected to an electronic computer on board the vehicle (not shown) of BCM ("body controller module") type, which manages the identification requests transmitted by said LF antenna. When the hand M of the user approaches the electrode E1 or E2, the user acts as a second electrode, connected to ground, which increases the capacitance of the detection capacitor to a capacitance higher than the nominal capacitance of the detection capacitor "at rest" (i.e. in the absence of a user).

The change in the capacitance above a threshold confirms the detection of the approach of the hand of the user.

However, this detection device D from the prior art exhibits major drawbacks.

Specifically, the detection of the approach of a user using capacitive sensors (first and second electrode E1 and E2) is not robust.

The door P handles 10 are not watertight, and water e is therefore able infiltrate into them. To drain the infiltrated water e, the handle 10 comprises drainage holes t1, t2 which, for the sake of appearance, are small, and which do not drain the infiltrated water e quickly. This is all the more true in the case of salt water e, which is more viscous, the density of which is higher than that of rainwater e.

Capillary action phenomena also occur, that is to say chemical adhesion of water e to the plastic of the housing, which hinders the drainage of water e.

When water e infiltrates into the handle and stagnates therein, in the lower part of the handle 10, that is to say between the housing B, which is watertight and which comprises the electrodes E1 and E2, and the inner surface of the handle 10, capacitive coupling occurs between the conductive water e, one or both electrode(s) E1, E2 and the printed circuit board 80, and more particularly the ground thereof. This is illustrated in FIGS. 1 and 2. In FIG. 2, water e is present in the handle 10 between the housing B (on the side of the electrodes E1 and E2) and the printed circuit board 80. Electrical coupling C between the first electrode E1 or the second electrode E2 and the ground plane P of the printed circuit board 80 through water e deteriorates the operation of the capacitive sensor(s), and this (these) no longer work(s). The locking zone Z1 or respectively the unlocking zone Z2 is reduced, or even no longer exists.

One solution from the prior art consists in increasing the number of drainage holes t1, t2 or increasing their size. However, for the sake of the appearance of the handle, this is not desirable. In addition, this does not solve the problem of draining water e that is linked to capillary action phenomena.

Another solution from the prior art consists in making the handle P watertight. The method for manufacturing the handle P then becomes more expensive than that of a non-watertight handle P, which is not desirable either.

SUMMARY OF THE INVENTION

An aspect of the invention proposes a device for detecting intention to lock or to unlock, intended to be integrated into a non-watertight door handle, which overcomes this problem.

In this case, the device according to an aspect of the invention allows water e to stagnate in the lower part of the handle 10 without impacting the operation of the capacitive sensor(s).

An aspect of the invention proposes a device for detecting a user's intention to lock or to unlock a motor vehicle door, said device being contained in a watertight housing, integrated into a non-watertight handle the lower part of which comprises drainage holes defining a drainage line for the drainage of infiltrated water, a part of the housing being immersed in water, said device comprising:
- a capacitive approach and/or contact detection sensor, comprising at least one detection electrode, having a variable detection capacitance representative of the approach of the hand of a user,
- a charging/discharging capacitor,
- a microcontroller, connected to a ground plane and to a voltage source, measuring a detection capacitance,
- first switching means connected to the microcontroller and to a first terminal of the charging/discharging capacitor,
- second switching means connected to the microcontroller, to a second terminal of the charging/discharging capacitor, and to the detection electrode,
- the first and second switching means being designed to charge/discharge the detection capacitor and the charging/discharging capacitor, said device being noteworthy in that:
  the detection electrode and the ground plane are arranged above the drainage line,
  and in that the device furthermore comprises at least one protective electrode contained in the part of the housing that is immersed in water, separated from the detection electrode such that there is electrical coupling between the protective electrode and the detection electrode, the protective electrode being electrically connected to the first switching means at the same time as the first terminal of the charging/discharging capacitor.

Preferably, the microcontroller and the ground plane are integrated into a printed circuit board.

An aspect of the invention also relates to a method for detecting a user's intention to lock or to unlock a motor vehicle door, comprising a detection device, said device being contained in a watertight housing, integrated into a non-watertight handle, the lower part of which comprises drainage holes, a part of the housing being immersed in water, said device comprising:
- a capacitive approach and/or contact detection sensor, comprising at least one detection electrode, having a variable detection capacitance representative of the approach of the hand of a user
- a charging/discharging capacitor,
- a voltage source,
- the method comprising the following steps:
  step E1: charging the detection capacitor,
  step E2: discharging the detection capacitor into the charging/discharging capacitor,
  step E3: measuring the voltage across the terminals of the detection electrode
  step E4: discharging the charging/discharging capacitor and the detection capacitor,
  step E5: simultaneously charging the charging/discharging capacitor and the detection capacitor, forming a capacitive divider bridge,
  step E6: measuring the voltage across the terminals of the detection electrode,
  step E7: calculating a difference between the voltage measurement performed in step E3 and the voltage measurement performed in step E6
  step E8: confirming the approach if the difference is greater than a predetermined threshold,
  the method being noteworthy in that, before step E1, a protective capacitor is connected to a first terminal of the charging/discharging capacitor, such that, in steps E1 to E6, said protective capacitor is connected simultaneously to the same potential as the first terminal of the charging/discharging capacitor, the protective capacitor being electrically coupled to the detection capacitor.

An aspect of the invention also applies to any door handle or motor vehicle comprising a detection device according to any one of the features listed above.

BRIEF DESCRIPTION OF THE DRAWINGS

Other aims, features and advantages of aspects of the invention will become apparent upon reading the following description provided by way of nonlimiting example and upon examining the appended drawings, in which.

DETAILED DESCRIPTION OF THE PREFERRED EMBODIMENTS

Figure 1:
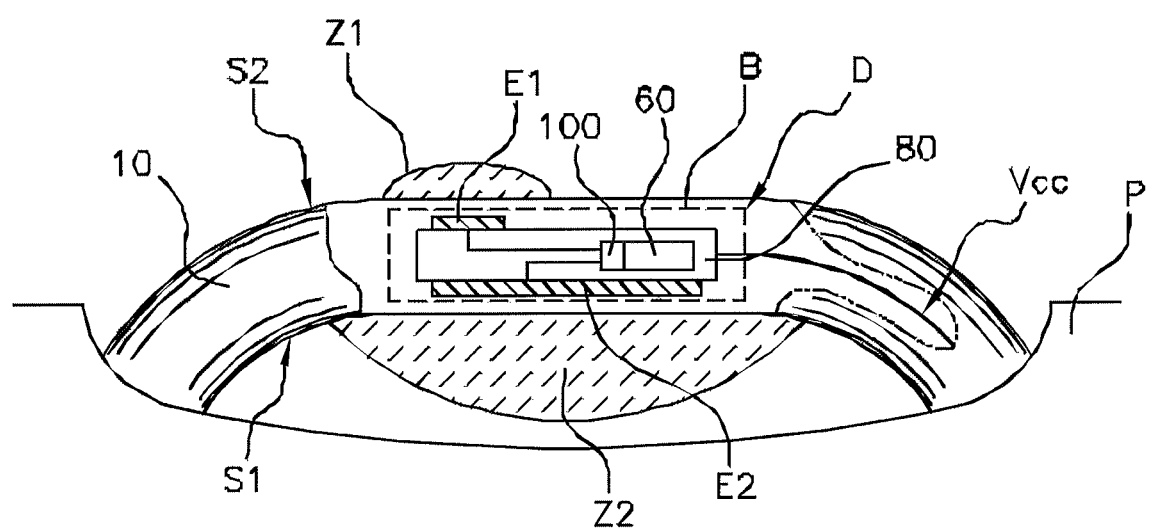
FIG. 1 shows a motor vehicle door P handle 10 comprising a detection device D from the prior art.
Figure 2:
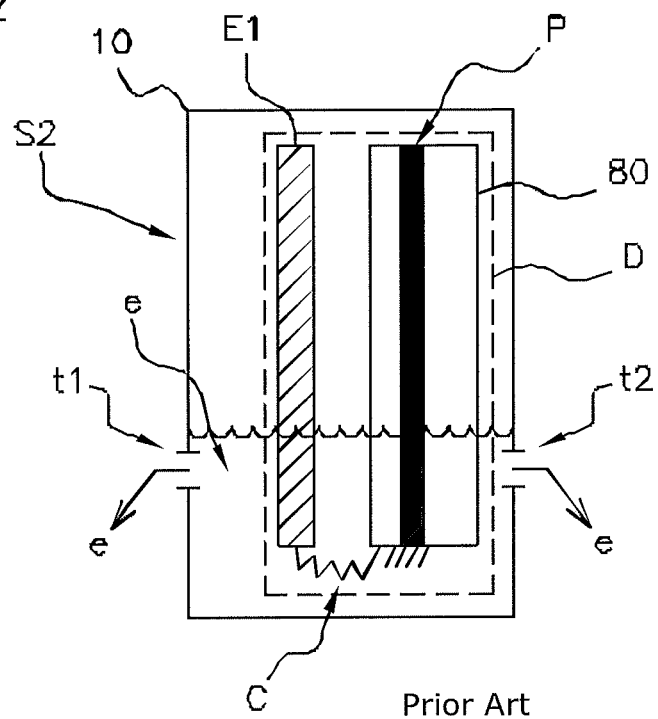
FIG. 2 shows a sectional view of the motor vehicle door P handle 10 comprising a detection device D according to the prior art, illustrating the phenomenon of the infiltration of water e into the handle, and the electrical coupling C between the unlocking electrode E1 and the ground plane P contained in the printed circuit board 80.

As explained above, the detection device D from the prior art shown in FIGS. 1 and 2 has the major drawback of no longer working when water e infiltrates into the non-watertight handle P and stays in the lower part of the handle 10, creating electrical coupling C between either the locking electrode E1 or the unlocking electrode E2 or said two electrodes and the ground plane P of the printed circuit board 80. This electrical coupling C makes the capacitive sensor 100 less sensitive, or even inoperative. This electrical coupling phenomenon exists even though the housing B in which the electrodes E1 and E2 and the printed circuit board 80 and its ground plane P are situated is watertight.

Approach and/or contact detection is no longer reliable, or even impossible.

An aspect of the invention proposes a detection device D' for overcoming this drawback.

According to an aspect of the invention, the device D' for detecting intention to lock or to unlock is intended to be integrated into a non-watertight handle 10'.

Non-watertight handle 10' is understood to mean a handle 10' into which rainwater e, ice or snow is able to infiltrate and temporarily stagnate in a lower part of the handle 10' until it drains to the outside through drainage holes t1, t2 that are formed in the handle 10' and provided for this purpose.

The drainage holes t1, t2 for the infiltrated water e are generally situated on either side of the handle 10' in order to facilitate the flow of water e to the outside.

The water e that infiltrates into the lower part of the handle 10' will accumulate up to a maximum level in the handle 10' that corresponds to a balance between the amount of infiltrated water e and the amount of water e that is drained simultaneously through the drainage holes t1, t2.

This maximum level will be called the water drainage line l. Said water drainage line l depends on the speed of infiltration and drainage of water e, but also on its density (salt water, for example, has a higher density and flows more slowly than unsalted water) and also on its temperature and on the arrangement of the drainage holes t1, t2.

The water drainage line l may be determined beforehand through tests.

An aspect of the invention will be described here applied to the locking electrode E2', but may of course be applied to any detection electrode, situated in a watertight housing B', comprising a ground plane P', contained in a non-watertight handle 10'.

The detection device D', situated in a watertight housing B', at least part of which is situated in the lower part of the handle 10, under the drainage line l and therefore immersed in infiltrated water e, comprises, as in the prior art, at least one capacitive approach and/or contact detection sensor 100 for detecting the approach and/or contact of a hand of the user on the handle 10', itself comprising:

at least one detection electrode E2', situated close to a detection surface S1 of the handle 10', forming, with the hand of the user, a variable detection capacitance Ce, representative of the approach of the hand M of a user toward the detection surface S1, a microcontroller 60', connected to a ground plane P, the microcontroller 60' and the ground plane being integrated into a printed circuit board 80, a charging/discharging capacitor Cs, able to charge/discharge the detection capacitor Ce, a voltage source Vcc;

first switching means Sw1 connected to a first terminal of the charging/discharging capacitor Cs, and connected to the microcontroller 80', making it possible to adjust the voltage across the terminals of said charging/discharging capacitor Cs, second switching means Sw2 connected to a second terminal of the charging/discharging capacitor Cs and connected to the detection electrode E2', making it possible to adjust the voltage of the detection electrode E2' at the same time as the voltage of the second terminal of the charging/discharging capacitor Cs, the first and second switching means Sw1, Sw2 being designed to charge/discharge the detection capacitor Ce and the charging/discharging capacitor (Cs), a voltage Ve, Ve' variation of the detection electrode E2' making it possible to confirm the detection of the approach of the hand M of the user, as described hereinafter, means for measuring the voltage across the terminals of the detection electrode E2' (M1), integrated into the microcontroller 60'

Figure 3:
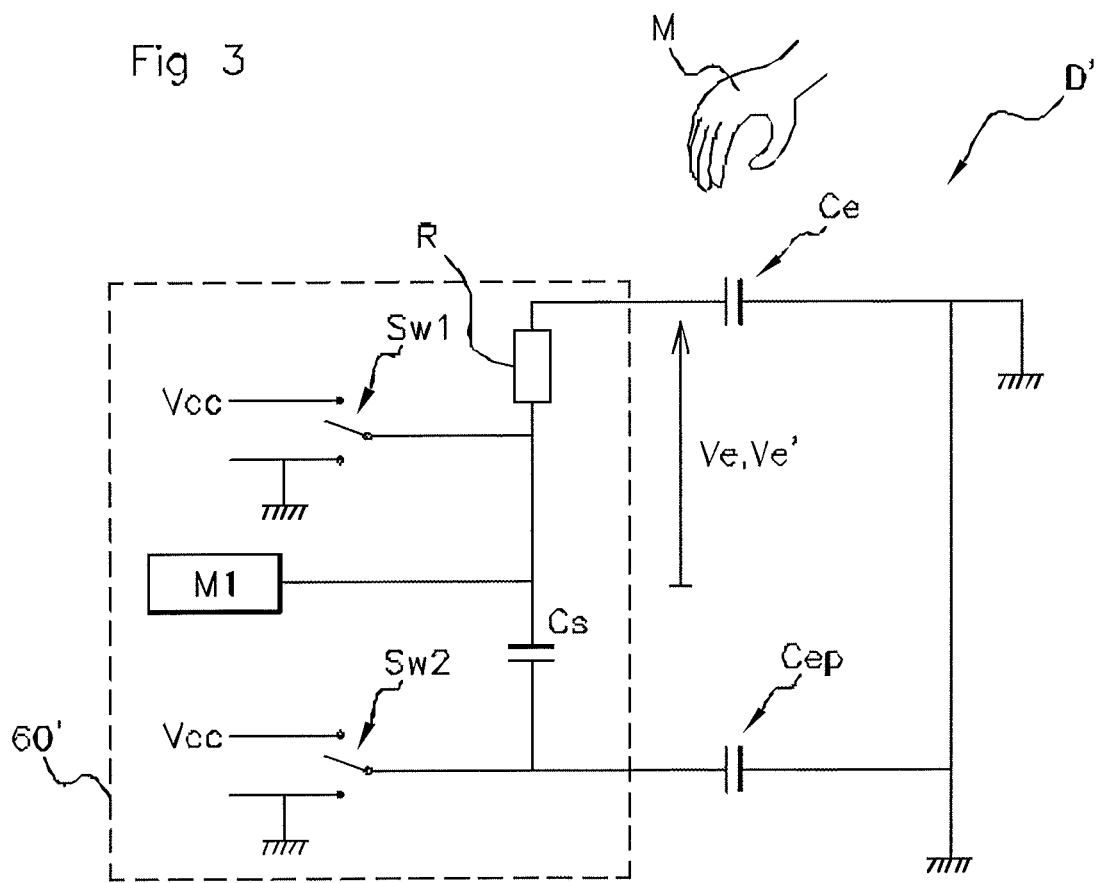
FIG. 3 is a schematic illustration of the detection device D' according to an aspect of the invention, comprising a protective capacitor Cep.
Figure 4:
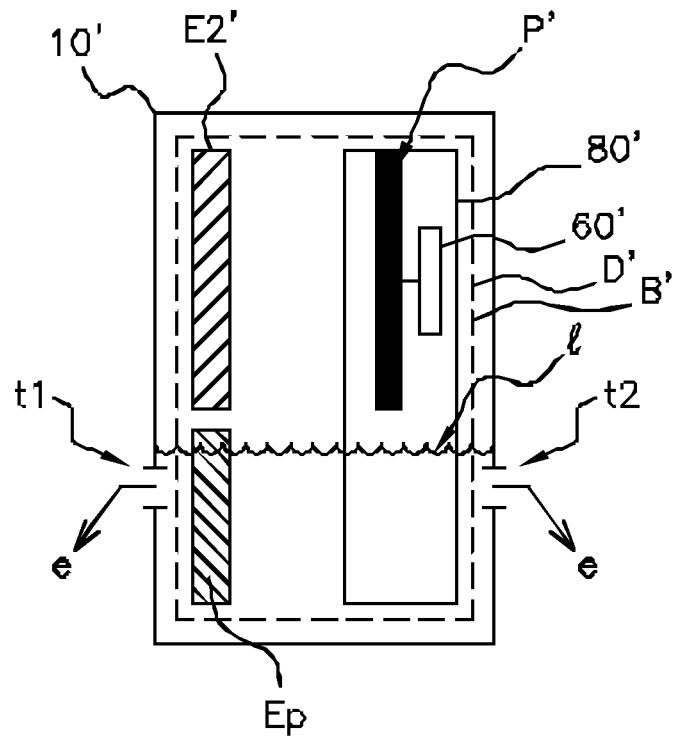
FIG. 4 is a sectional view of the handle 10' comprising the detection device D' of an aspect of the invention, with the protective electrode Ep, situated in the lower part of the handle 10', a part of which is situated under the water e drainage line l.
Figure 5:
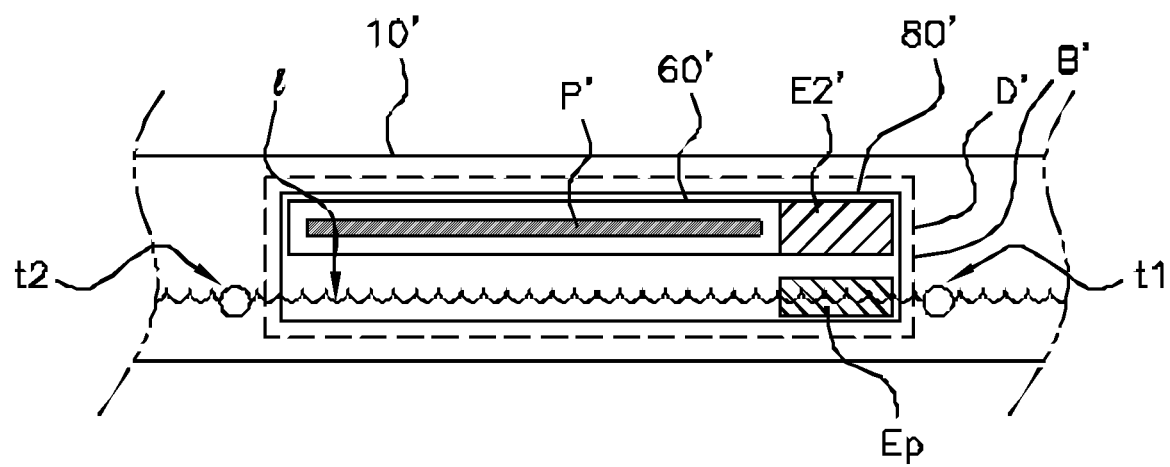
FIG. 5 shows a front-on view of the handle 10' comprising the detection device D' of an aspect of the invention.

This is illustrated in FIG. 3.

The microcontroller 60' comprises means (not shown) for controlling the first and second switching means Sw1, Sw2.

The first and second switching means Sw1, Sw2 make it possible to connect the first terminal of the charging/discharging capacitor Cs or respectively the second terminal of the charging/discharging capacitor Cs and the detection electrode E2' (which forms a variable capacitance Ce with the hand M of the user):

in a first position: to a non-zero voltage, for example to the supply voltage Vcc, in a second position to electrical ground and in a third position, in an open circuit, more precisely to a potential that is left floating.

The capacitive sensor 100 from the prior art operates as follows:

in a first step (step E1), the first and second switching means Sw1, Sw2 are in the first position, that is to say connected to the non-zero voltage source Vcc (for example 3.3 V). In this first step, the detection capacitor Ce charges. In a second step (step E2), the second switching means Sw2 are in the third position (open circuit) and the first switching means Sw1 are in the second position (connected to ground); in this configuration, the detection capacitor Ce partially discharges into the charging/discharging capacitor Cs until a charge balance is achieved between the two capacitors. Once a balance has been achieved, the voltage Ve across the terminals of the detection electrode is measured (step E3). In practice, said voltage Ve is measured between ground and the second switching means Sw2, because the potential difference across the terminals of the resistor R is zero (the current is zero once a balance has been achieved, see FIG. 3).

Then, in a fourth step E4, the two switching means Sw1, Sw2 are in the second position (connected to ground) and the two detection and charging/discharging capacitors Ce and Cs discharge completely.

In a fifth step (step E5), the second switching means Sw2 are in the third position (open circuit) and the first switching means Sw1 are in the first position (connected to the supply voltage source Vcc), the charging/discharging capacitor Cs and detection capacitor Ce charge. In this configuration, the charging/discharging capacitor Cs and the detection capacitor Ce form a capacitive divider bridge. Once charging is complete, the voltage Ve' across the terminals of the detection electrode (that is to say between ground and the second switching means S2) is then measured; this is also given by the mathematical relationship (sixth step E6):

$$Ve' = \frac{Vcc \times Cs}{(Cs + Ce)}$$

This new measurement of the voltage Ve' across the terminals of the electrode performed in the sixth step E6 is subtracted from the measurement of the voltage across the terminals of the electrode performed beforehand, Ve, in the third step E3. A difference N is thus obtained, this being equal to:

$$N = Ve - Ve'$$

If the hand of the user M approached the detection electrode E2', the detection capacitance Ce increased, and therefore the voltage Ve across the terminals of the electrode measured in the third step E3 increased and the voltage Ve' across the terminals of the electrode measured during the sixth step E6 e' decreased. Therefore, the detection of the approach of the hand M is confirmed when the difference N exceeds a predetermined threshold.

The approach and/or contact detection is confirmed when the difference N between the voltage Ve across the terminals of the detection electrode measured in the third step and the one Ve' measured in the sixth step E6 is greater than a threshold, that is to say:

$$N > Th$$

This method for detecting intention to lock or to unlock by way of a capacitive sensor is known to those skilled in the art and will not be described in more detail here.

An aspect of the invention proposes for the detection electrode E2' and the ground plane to be arranged above the drainage line l, and for the device D' to furthermore comprise at least one protective electrode Ep.

However, an aspect of the invention proposes for this protective electrode Ep to be arranged in the handle 10' in a particular manner contrary to the prior art.

Specifically, an aspect of the invention proposes for the protective electrode Ep to be contained in the housing B', in the lower part of the handle 10', situated below the drainage line l. In other words, the protective electrode Ep is situated partly in the part of the housing B' that is immersed in infiltrated water e.

The protective electrode Ep is separate from the detection electrode E2' and from the ground plane P, and has a protective capacitor Cep. Said protective electrode Ep is close enough to the detection electrode E2' for there to be electrical coupling between the protective capacitor Cep and the detection capacitor Ce (cf. FIG. 3). The surface area of the protective electrode Ep is smaller than that of the detection electrode E2', the protective electrode Ep not being connected upstream to a resistor, the variation in the protective capacitance Cep upon the approach of a hand is negligible and will be ignored in the detection method of an aspect of the invention.

Electrical coupling is understood to mean stray capacitive coupling between the two capacitors Ce and Cep.

According to an aspect of the invention, the protective electrode Ep is electrically connected to the first switching means Sw1 at the same time as the first terminal of the charging/discharging capacitor Cs. In other words, the protective capacitor Cep and the first terminal of the charging/discharging capacitor Cs are simultaneously at the same potential during steps E1 to E6 of the detection method. This is described hereinafter.

The method for detecting intention to lock/unlock will now be described.

In the first step (step E1), the first and second switching means Sw1, Sw2 are in the first position, that is to say connected to the non-zero voltage source Vcc (for example 3.3 V). In this first step, the detection capacitor Ce charges, the two terminals of the charging/discharging capacitor Cs are at the same potential, said charging/discharging capacitor Cs remains discharged, and the protective electrode is at the supply voltage Vcc. The protective electrode Ep then plays the role of shielding the voltage Vcc of the detection electrode E2' against water e. The protective electrode Ep in this case avoids potential coupling between the detection electrode E2' and the ground plane P' by way of water e and reduces the capacitance of the detection electrode E2', thereby not only accelerating the charging of the detection electrode E2' but also increasing the detection sensitivity of the detection electrode E2'.

In the second step (step E2), the second switching means Sw2 are in the third position (open circuit) and the first switching means Sw1 are in the second position (connected to ground); in this configuration, the detection capacitor Ce partially discharges into the charging/discharging capacitor Cs until a charge balance is achieved between the two capacitors. Once a balance has been achieved, the voltage Ve across the terminals of the detection electrode is measured (step E3). In this second step E2, the protective electrode Ep is connected to ground. There is then weak coupling between the detection electrode E2' and the protective electrode Ep, but this has only a slight impact on the voltage Ve measurement.

Then, in a fourth step, the two switching means Sw1, Sw2 are in the second position (connected to ground) and the two detection and charging/discharging capacitors Ce and Cs discharge completely, and the protective electrode Ep is also connected to ground, this having no effect on the discharging of said two capacitors Ce and Cs.

In the fifth step (step E5), the second switching means Sw2 are in the third position (open circuit) and the first switching means Sw1 are in the first position (connected to Vcc), the charging/discharging capacitor Cs and the detection capacitor Ce charge partially until achieving a balance. In this configuration, the charging/discharging capacitor Cs and the detection capacitor Ce form a capacitive divider bridge. Once charging is complete, the voltage Ve' across the terminals of the detection electrode E2' is measured (step E6); this is also given by the mathematical relationship (sixth step E6):

$$Ve' = \frac{Vcc \times Cs}{(Cs + Ce)}$$

This new measurement of the voltage across the terminals of the electrode Ve' is subtracted (step E7) from the one performed beforehand, Ve, in the third step E3, to obtain the difference N:

$$N = Ve - Ve'$$

In this configuration of the fifth step (step E5), the protective electrode Ep is connected to the supply voltage Vcc, and it again plays the role of shielding the detection electrode E2' against water e. In addition, the protective electrode Ep decreases the detection capacitance Ce and contributes to accelerating the discharging and to improving the detection sensitivity of said electrode E2'.

If the hand of the user M approached the detection electrode E2', the detection capacitance Ce increased, and therefore the voltage Ve across the terminals of the detection electrode measured in the third step E3 increased and the voltage Ve' across the terminals of the detection electrode measured in the sixth step E6 decreased. The detection of the approach of the hand is confirmed when the difference N exceeds a predetermined threshold (step E8).

The approach and/or contact detection is confirmed when the difference N between the voltage Ve across the terminals of the detection electrode measured in the third step E3 and the one Ve' measured in the sixth step E6 is greater than a threshold, that is to say:

$N > Th$

The presence of the protective electrode Ep not only makes it possible to avoid coupling to ground of the detection electrode E2', but by being at the charging potential Vcc during the charging of the detection electrode E2', in the first step E1, it makes it possible to accelerate the charging of said electrode.

Likewise, as the protective electrode Ep is at the charging potential Vcc during the charging of the charging/discharging electrode Cs and that of the detection electrode E2', in the fifth step E5, said protective electrode Ep decreases the detection capacitance Ce and therefore accelerates the charging of said detection electrode E2'.

An aspect of the invention therefore expediently makes it possible, by adding a protective electrode Ep connected to the same potential as a terminal of the charging/discharging capacitor Cs, electrically coupled to the detection electrode and arranged in the part of the watertight housing that is immersed in water that has infiltrated into the handle, not only to avoid electrical coupling between the protective electrode and ground through water, but it also makes it possible to improve the detection sensitivity of the detection electrode E2'.

The invention claimed is:

1. A device for detecting a user's intention to lock or to unlock a motor vehicle door, said device being contained in a watertight housing, integrated into a non-watertight handle a lower part of which comprises drainage holes defining a drainage line for the drainage of water that has infiltrated into a part of the housing immersed in water, said device comprising:
   a capacitive approach and/or contact detection sensor, comprising at least one detection electrode, having a variable detection capacitance representative of an approach of a hand of the user,
   a charging/discharging capacitor,
   a microcontroller, connected to a ground plane and to a voltage source, measuring a detection capacitance,
   first switching means connected to the microcontroller and to a first terminal of the charging/discharging capacitor, and
   second switching means connected to the microcontroller, to a second terminal of the charging/discharging capacitor, and to the detection electrode,
   the first and second switching means being designed to charge/discharge the detection capacitor and the charging/discharging capacitor,
   wherein the detection electrode and the ground plane are arranged above the drainage line,
   at least one protective electrode contained in the part of the housing that is immersed in water, separated from the detection electrode such that there is electrical coupling between the protective electrode and the detection electrode, the protective electrode being electrically connected to the first switching means at the same time as the first terminal of the charging/discharging capacitor.

2. The detection device as claimed in claim 1, wherein the microcontroller and the ground plane are integrated into a printed circuit board.

3. A door handle, comprising a detection device as claimed in claim 1.

4. A motor vehicle, comprising a detection device as claimed claim 1.

5. A door handle, comprising a detection device as claimed in claim 2.

6. A motor vehicle, comprising a detection device as claimed claim 2.

7. A method for detecting a user's intention to lock or to unlock a motor vehicle door, comprising a detection device, said device being contained in a watertight housing, integrated into a non-watertight handle the a lower part of which comprises drainage holes, a part of the housing being immersed in water, said device comprising:
   a capacitive approach and/or contact detection sensor, comprising at least one detection electrode, having a variable detection capacitance representative of an approach of a hand of the user,
   a charging/discharging capacitor,
   a voltage source;
   the method comprising:
      step E1: charging the detection capacitor,
      step E2: discharging the detection capacitor into the charging/discharging capacitor,
      step E3: measuring a voltage across the terminals of the detection electrode,
      step E4: discharging the charging/discharging capacitor and the detection capacitor,
      step E5: simultaneously charging the charging/discharging capacitor and the detection capacitor, forming a capacitive divider bridge,
      step E6: measuring a further voltage across the terminals of the detection electrode,
      step E7: calculating a difference between the voltage measurement performed in step E3 and the voltage measurement performed in step E6, and
      step E8: confirming the approach if the difference is greater than a predetermined threshold,
   wherein, before step E1, a protective capacitor is connected between a first terminal of the charging/discharging capacitor, such that, in steps E1 to E6, said protective capacitor is connected simultaneously to a same potential as the first terminal of the charging/discharging capacitor, the protective capacitor being electrically coupled to the detection capacitor.

* * * * *